Figure 1:
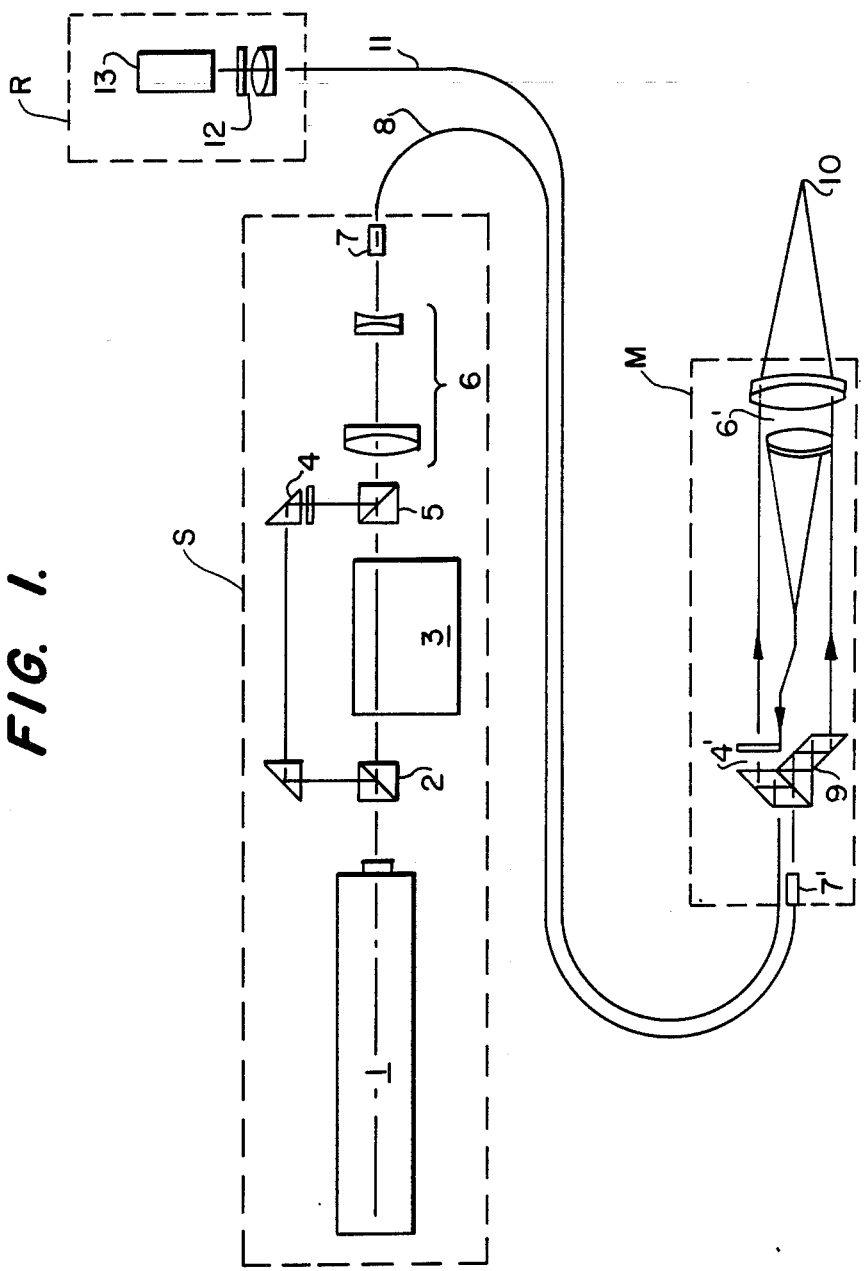

United States Patent [19]

Knühtsen et al.

[11] Patent Number: 4,575,238
[45] Date of Patent: Mar. 11, 1986

[54] LASER-DOPPLER-ANEMOMETER

[75] Inventors: John Knühtsen, Virum; Peder E. S. Olldag, Humlebaek, both of Denmark

[73] Assignee: Disa Elektronik A/S, Skovlunde, Denmark

[21] Appl. No.: 530,588
[22] PCT Filed: Dec. 28, 1981
[86] PCT No.: PCT/DK81/00120
 § 371 Date: Aug. 25, 1983
 § 102(e) Date: Aug. 25, 1983
[87] PCT Pub. No.: WO83/02329
 PCT Pub. Date: Jul. 7, 1983

[51] Int. Cl.⁴ .................................................. G01P 3/36
[52] U.S. Cl. ..................................... 356/28.5; 356/28
[58] Field of Search ....................... 356/28, 28.5, 349

[56] References Cited

U.S. PATENT DOCUMENTS 4,387,993 6/1983 Adrian ............................... 356/28.5
4,470,696 9/1984 Ballard ................................. 356/28

OTHER PUBLICATIONS

Dyott, "The Fiber-Optic Doppler Anemometer," Microwaves, Optics and Acoustics, Jan. 1978, vol. 2, No. 1, pp. 13-18.

Kyuma et al., "Laser Doppler Velocimeter with a Novel Optical Fiber Probe," Applied Optics: vol. 20, No. 14, Jul. 15, 1981, pp. 2424-2427.

Primary Examiner—S. C. Buczinski
Assistant Examiner—Melissa Koltak
Attorney, Agent, or Firm—Bernard, Rothwell & Brown

[57] ABSTRACT

In a laser-doppler-anemometer two frequency-displaced partial beams are transmitted from a transmitted device including a laser to a measuring probe positioned at a remote measuring volume by means of a polarization-direction-preserving optical "single-mode" fiber with two orthogonal principal axes, the transmitter including a member for turning the polarization direction of one partial beam by 90°, and the measuring probe including another polarization-direction-turning member for re-establishing the original coincidence between the polarization directions of the two partial beams. The transmitting device may thus be positioned at a distance from the measuring volume while the measuring probe may be designed with small physical.

1 Claim, 4 Drawing Figures

LASER-DOPPLER-ANEMOMETER

This invention relates to a laser-doppler-anemometer of the kind in which a radiation beam having a predetermined direction of polarization emitted from a laser is separated into two spatially distinct partial beams, one of which is led through a frequency displacement device, following which the separated frequency-displaced partial beams having the same direction of polarization are focussed in a measuring volume for measuring the rate of flow of a liquid or gaseous medium by interference between said partial beams, whereby an interference picture is supplied to a photoelectric receiving device.

Such a laser-doppler-anemometer is applicable for contactless, non-field disturbing measuring of flow rates of liquid or gaseous media. The measurement depends on photoelectric detection of the movement of a particle conveyed by the flowing medium through the interference pattern of the partial beams focussed in the measuring volume. As for other speed measurings applying the doppler-principle two mutually frequency-displaced coherent laser radiation beams are used to detect the direction of flow, said radiation beams having moreover the same direction of polarization and being synchronized as to their phase.

Thus, in the paths of the two partial beams elements causing different directions of polarization of the partial beams focussed in the measuring volume or influencing them differently as to their phase may not be present.

In flow measuring systems applying laser-doppler-anemometry it has therefore been considered necessary to position the comparatively bulky laser-equipment with associated frequency-displacing and focussing elements directly adjacent to the measuring volume, but this has restricted the possibilities of application.

The said deficiency is remedied according to the present invention in that the laser together with a first beamsplitter for separating the laser radiation beam into said spatially distinct partial beams and said frequency-displacing member affecting one partial beam form parts of a transmitting device which further includes a first polarization-direction-turning device positioned in the path of one of said spatially distinct partial beams for turning the direction of polarization of said partial beam by 90°, and another beamsplitter for spatially uniting said two frequency-displaced partial beams having directions of polarization mutually displaced by 90°, said transmitting device being connected with the inlet end of a polarization-direction-preserving optical "single-mode" fiber having two orthogonal principal axes adjusted to each respective of said two directions of polarization of said partial beams displaced by 90°, the outlet end of said fiber being connected with a measuring probe to be positioned close to said measuring volume and accommodating an additional beamsplitter for spatially separating the partial beams transmitted through the fiber into partial beams with each respective of said two directions of polarization displaced by 90°, and a second polarization turning member acting on one of said partial beams for turning the direction of polarization of said partial beam to the same direction of polarization as that of the other partial beam.

By using an optical "single-mode" fiber of the kind concerned as transmitting medium for spatially distinct frequency-displaced partial beams of laser radiation it is made possible to position the bulky part of the measuring equipment at a comparatively great distance from the measuring volume, as the measuring probe connected with the outlet end of the fiber may have small physical dimensions. Between the transmitting device and the measuring probe arranged at the measuring volume light is being transmitted solely in the form of said partial beams, thereby eliminating the risk of disturbances and noise when transmitting electrical supply flows and signals through cables onto an inaccesible measuring volume.

Optical "single-mode"-fibers of the kind concerned are described, inter alia, in an article by IVAN P. KAMINOW "Polarization in Optical Fibers" in IEEE Journal of Quantum Electronics, Vol. QE-17, No. 1, January 1981, pages 15 to 22 and offer the possibility of transmitting two partial beams having different polarization directions with completely uniform influence on said partial beams as to their phase.

Figure 2:
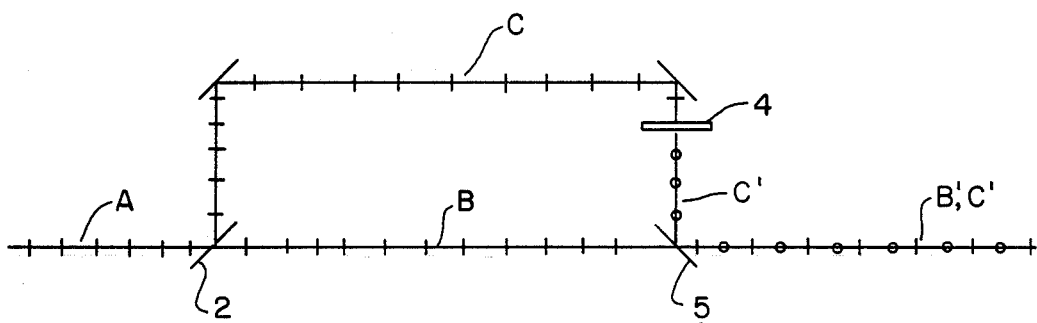
Figure 3:
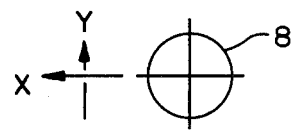
Figure 4:
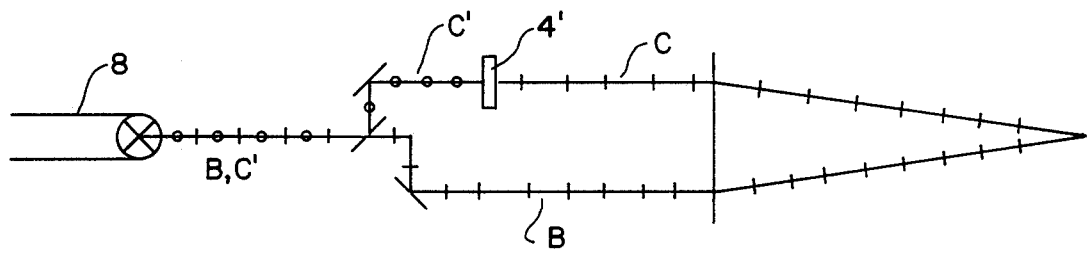

In the following, the invention will be more fully explained with reference to the accompanying drawings, in which FIG. 1 is a schematic view of the structure of a laser-doppler-anemometer according to the invention, and FIGS. 2–4 illustrate the radiation course and polarization directions at the inlet and outlet of a polarization-direction-preserving optical single-fiber in the structure of FIG. 1.

In the measuring equipment shown in FIG. 1 a coherent radiation beam A having a predetermined polarization direction as shown in FIG. 2 is emitted from a transmitter device S comprising a laser 1, e.g. an He-Ne-laser or an Ar-laser. By means of an optical beamsplitter 2 the radiation beam A is separated in the transmitter device S into two spatially distinct partial beams B and C. The partial beam B is led through a frequency-displacement device 3, such as an acousto-optical Bragg-cell which displaces the frequency of the partial beam by a doppler-frequency of 40 MHz. In the transmitter device S, the partial beam C is conducted through a first polarization-direction-turning member 4 in the form of a λ/2-plate turning the polarization direction of this partial beam through 90°. The partial beams B and C' now mutually displaced as to frequency and having polarization directions displaced by 90° are spatially united in the transmitting device S by means of a polarization beamsplitter 5 and are focussed by means of a lens system 6 and a focussing optical fiber 7 in the form of a so-called "selfoc"-lens at the inlet end connected with the transmitter device S of a polarization-direction-preserving optical "Single-mode" fiber 8 of the kind disclosed in the above mentioned article.

As it will best appear from FIG. 3, the fiber 8 has two orthogonal principal axes X and Y and such an orientation at its connection with the transmitting device S that said axes X and Y are adjusted to each respective one of the polarization directions in the united radiation beams B and C' from the polarization beamsplitter 5.

At its outlet end the fiber 8 is connected with a measuring probe M positioned adjacent a measuring volume 10 and in which the radiation beams B and C' transmitted through the fiber is focussed by means of a focussing optical fiber 7' of the same kind as the focussing optical fiber 7 in the transmitting device S on a polarization-direction-separating beamsplitter 9 to spatially separate the transmitted frequency-displaced partial beams B and C', so as to provide two parallel partial beams B and C' having each a respective polarization direction, as illustrated in FIG. 4. In the measuring probe M, the partial beam C' is now conducted through another polarization-direction-turning member 4' in the form of a λ/2-plate turning the polarization direction of said partial beam back by 90°, so that it coincides again with the polarization direction of the other partial beam B. The spatially distinct partial beams B and C then occurring are focussed by means of a lens system 6' on the measuring volume 10.

The picture produced by interference between the frequency-displaced subbeams B and C focussed in the measuring volume 10 is focussed by means of the lens system 6' at the inlet end of a conventional optical fiber 11 leading to a receiving device R containing an interference filter 12 and a photodetector 13.

By making use of the fibers 8 and 11 as light conductors the measuring probe M to be arranged at the measuring volume 10 may be designed with small physical dimensions, as it shall only include the focussing optical fiber 7', the polarization beamsplitter 9, the λ/2-plate 4' and the focussing lens system 6', while the transmitting device S and the receiving device R accommodating the more bulky parts of the equipment, in particular the laser 1 and its associated members 2 to 7, may be disposed at a distance from said measuring volume. The permissible distance depends on the type of the laser and the demands for transmission quality and noise and temperature conditions. Without any difficulty a distance up to 50 m is allowable.

The polarization-direction-turning members 4 and 4', i.e. the λ/2-plates may be arbitrarily positioned in the paths of the spatially distinct partial beams, provided two spatially separated partial beams with polarization directions displaced by 90° be produced in the transmitting device and two frequency-displaced partial beams having the same polarization direction be produced in the measuring probe.

We claim:

1. A laser-doppler-anemometer of the kind in which a radiation beam (a) having a predetermined direction of polarization emitted from a laser (1) is separated into two spatially distinct partial beams (B, C), one of which is led through a frequency displacement device (3), following which the separated frequency-displaced partial beams (B, C') having the same direction of polarization are focussed in a measuring volume (10) for measuring the rate of flow of a liquid or gaseous medium by interference between said partial beams, whereby an interference picture is supplied to a photoelectric receiving device (12, 13), characterized in that the laser (1) together with a first beamsplitter (2) for separating the laser radiation beam (A) into said spatially distinct partial beam (B, C) and said frequency-displacing member (3) affecting one partial beam (B) form parts of a transmitting device (S) which further includes a first polarization-direction-turning device (4) positioned in the path of one of said spatially distinct partial beams (B, C) for turning the direction of polarization of said partial beam (C) by 90°, and another beamsplitter (5) for spatially uniting said two frequency-displaced partial beams (B, C') having directions of polarization mutually displaced by 90°, said transmitting device (S) being connected with the inlet end of a polarization-direction-preserving optical "single-mode"-fiber (8) having two orthogonal principal axes (Z, Y) adjusted to each respective of said two directions of polarization of said partial beams (B, C') displaced by 90°, the outlet end of said fiber (8) being connected with a measuring probe (M) to be positioned close to said measuring volume (10) and accommodating an additional beamsplitter (9) for spatially separating the partial beams (B, C') transmitted through the fiber (8) into partial beams with each respective of said two directions of polarization displaced by 90°, and a second polarization turning member (4') acting on one of said partial beams (C') for turning the direction of polarization of said partial beam to the same direction of polarization as that of the other partial beam (B).

* * * * *